United States Patent
Yang et al.

(10) Patent No.: US 11,362,815 B2
(45) Date of Patent: Jun. 14, 2022

(54) TRUSTED DATA TRANSMISSION METHODS, APPARATUSES, AND DEVICES

(71) Applicant: ALIPAY (HANGZHOU) INFORMATION TECHNOLOGY CO., LTD., Zhejiang (CN)

(72) Inventors: Renhui Yang, Hangzhou (CN); Shubo Li, Hangzhou (CN); Yuan Chen, Hangzhou (CN); Wenyu Yang, Hangzhou (CN); Qin Liu, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/359,475

(22) Filed: Jun. 25, 2021

(65) Prior Publication Data
US 2021/0328780 A1    Oct. 21, 2021

(30) Foreign Application Priority Data
Aug. 28, 2020    (CN) .......................... 202010888051.8

(51) Int. Cl.
*H04L 9/08*    (2006.01)
*H04L 9/32*    (2006.01)
*H04L 67/561*    (2022.01)

(52) U.S. Cl.
CPC .......... *H04L 9/0825* (2013.01); *H04L 9/0894* (2013.01); *H04L 9/3234* (2013.01); *H04L 9/3247* (2013.01); *H04L 67/2804* (2013.01)

(58) Field of Classification Search
CPC ... H04L 9/0825; H04L 9/0894; H04L 9/3234; H04L 9/3247; H04L 67/2804
See application file for complete search history.

(56) References Cited

U.S. PATENT DOCUMENTS 10,192,250 B1 *   1/2019   Christensen ....... G06Q 30/0623
10,505,741 B1 *   12/2019   Conley ................. H04L 9/083
(Continued)

FOREIGN PATENT DOCUMENTS

| CN | 1996955 | 7/2007 |
| CN | 103677935 | 3/2014 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Henry Tsang
(74) *Attorney, Agent, or Firm* — Fish & Richardson P.C.

(57) ABSTRACT

Embodiments of the present specification disclose trusted data transmission methods, apparatuses, and devices. One method comprising: identifying a data use request of a data requestor; identifying authorization information of a data owner; generating a data use authorization claim based on the authorization information, wherein the data use authorization claim indicates that the data owner authorizes the data requestor to use data; obtaining initial data based on the data use authorization claim; verifying the initial data to obtain target data that is successfully verified, wherein the target data comprises a data validity claim indicating a validity of the target data; and sending the target data to the data requestor.

15 Claims, 6 Drawing Sheets

(56) References Cited

U.S. PATENT DOCUMENTS

| | | | |
|---|---|---|---|
| 2018/0254898 A1 | 9/2018 | Sprague et al. | |
| 2019/0020661 A1* | 1/2019 | Zhang | H04L 9/3242 |
| 2020/0117818 A1* | 4/2020 | Latka | G06F 12/1466 |
| 2020/0177604 A1* | 6/2020 | Wei | H04L 63/0442 |
| 2021/0203503 A1* | 7/2021 | Soundararajan | H04L 9/3239 |

FOREIGN PATENT DOCUMENTS

| | | |
|---|---|---|
| CN | 104010044 | 8/2014 |
| CN | 105631322 | 6/2016 |
| CN | 106408486 | 2/2017 |
| CN | 107507091 | 12/2017 |
| CN | 107579979 | 1/2018 |
| CN | 107622385 | 1/2018 |
| CN | 107729745 | 2/2018 |
| CN | 107742189 | 2/2018 |
| CN | 107968709 | 4/2018 |
| CN | 108076011 | 5/2018 |
| CN | 108471350 | 8/2018 |
| CN | 108616539 | 10/2018 |
| CN | 108632284 | 10/2018 |
| CN | 108881160 | 11/2018 |
| CN | 108932297 | 12/2018 |
| CN | 108985089 | 12/2018 |
| CN | 109150607 | 1/2019 |
| CN | 109245893 | 1/2019 |
| CN | 109376504 | 2/2019 |
| CN | 109522722 | 3/2019 |
| CN | 109525400 | 3/2019 |
| CN | 109547500 | 3/2019 |
| CN | 109660358 | 4/2019 |
| CN | 109710270 | 5/2019 |
| CN | 109741039 | 5/2019 |
| CN | 109768865 | 5/2019 |
| CN | 109840436 | 6/2019 |
| CN | 109993490 | 7/2019 |
| CN | 110009232 | 7/2019 |
| CN | 110034924 | 7/2019 |
| CN | 110046165 | 7/2019 |
| CN | 110083610 | 8/2019 |
| CN | 110086804 | 8/2019 |
| CN | 110222533 | 9/2019 |
| CN | 110224837 | 9/2019 |
| CN | 110335149 | 10/2019 |
| CN | 110457875 | 11/2019 |
| CN | 110516178 | 11/2019 |
| CN | 11063 6062 | 12/2019 |
| CN | 110555292 | 12/2019 |
| CN | 110837658 | 2/2020 |
| CN | 110968743 | 4/2020 |
| CN | 110990804 | 4/2020 |
| CN | 111049660 | 4/2020 |
| CN | 111179067 | 5/2020 |
| CN | 111191268 | 5/2020 |
| CN | 111222157 | 6/2020 |
| CN | 111340627 | 6/2020 |
| CN | 111414599 | 7/2020 |
| CN | 111415157 | 7/2020 |
| CN | 111506662 | 8/2020 |
| CN | 111597565 | 8/2020 |
| CN | 111741036 | 10/2020 |
| WO | WO 2019078879 | 4/2019 |
| WO | WO 2019179535 | 5/2020 |

OTHER PUBLICATIONS

Nakamoto, "Bitcoin: A Peer-to-Peer Electronic Cash System," www.bitcoin.org, 2005, 9 pages.
U.S. Appl. No. 17/364,658, filed Jun. 30, 2021, Wenyu Yang.
U.S. Appl. No. 17/362,914, filed Jun. 29, 2021, Qin Liu.
U.S. Appl. No. 17/358,249, filed Jun. 25, 2021, Shubo Li.
U.S. Appl. No. 17/359,487, filed Jun. 25, 2021, Renhui Yang.
U.S. Appl. No. 17/348,975, filed Jun. 16, 2021, Renhui Yang.
U.S. Appl. No. 17/364,602, filed Jun. 30, 2021, Renhui Yang.
U.S. Appl. No. 17/349,764, filed Jun. 16, 2021, Qin Liu.
U.S. Appl. No. 17/359,069, filed Jun. 25, 2021, Yuan Chen.
U.S. Appl. No. 17/359,219, filed Jun. 25, 2021, Yuan Chen.
U.S. Appl. No. 17/359,476, filed Jun. 25, 2021, Wenyu Yang.
Extended European Search Report in European Application No. 21181030.4, dated Nov. 18, 2021, 11 pages.

\* cited by examiner

TRUSTED DATA TRANSMISSION METHODS, APPARATUSES, AND DEVICES

CROSS-REFERENCE TO RELATED APPLICATIONS

This application claims priority to Chinese Patent Application No. 202010888051.8, filed on Aug. 28, 2020, which is hereby incorporated by reference in its entirety.

TECHNICAL FIELD

The present application relates to the field of computer technologies, and in particular, to trusted data transmission methods, apparatuses, and devices.

BACKGROUND

A blockchain is a novel decentralized protocol, which can securely store digital currency transactions or other data. The information cannot be forged or tampered with. Transaction confirmation on the blockchain is completed by all nodes on the blockchain.

A distributed network is an infrastructure of the blockchain. The data generated on each node is broadcasted to other nodes by the distributed network, and other nodes verify the authenticity of the data through proof-of-work. Security and privacy are very important basic features in data transmission. Especially in the financial field, personal and enterprise asset data is private data, its security needs special attention, and random transmission of the data will cause a great potential hazard to the security of user data. However, the blockchain will not be utilized if the data with very high privacy is transmitted through a private network, but a risk of leakage can be caused if the data is transmitted through the blockchain.

Therefore, it is urgent to provide a trusted data transmission method to realize off-chain trusted data transmission.

SUMMARY

Embodiments of the present specification provide trusted data transmission methods, apparatuses, and devices to solve the problem that data transmission is not secure and untrusted in existing data transmission methods.

To solve the previously described technical problems, the embodiments of present specification are implemented as follows:

A trusted data transmission method provided by some embodiments of the present specification includes: a data use request of a data requestor is obtained; authorization information of a data owner is obtained; a data authorization use claim is generated based on the authorization information, where the data authorization use claim is used for indicating that the data owner authorizes the data requestor to use the data; initial data is obtained based on the data authorization use claim; the initial data is verified to obtain target data that passes the verification, where the target data includes a data validity claim, and the data validity claim is used for indicating the validity of the target data; and the target data is sent to the data requestor.

A trusted data transmission apparatus provided by some embodiments of the present specification includes: a data use request acquisition module, configured to obtain a data use request of a data requestor; an authorization information acquisition module, configured to obtain authorization information of a data owner; a data authorization use claim generation module, configured to generate a data authorization use claim based on the authorization information, where the data authorization use claim is used for indicating that the data owner authorizes the data requestor to use the data; an initial data acquisition module, configured to obtain initial data based on the data authorization use claim; a target data acquisition module, configured to verify the initial data to obtain target data that passes the verification, where the target data includes a data validity claim, and the data validity claim is used for indicating the validity of the target data; and a target data transmission module, configured to send the target data to the data requestor.

A trusted data transmission device provided by some embodiments of the present specification includes: at least one processor; and a memory communicatively connected to the at least one processor, where the memory stores instructions that can be executed by the at least one processor, and the instructions are executed by the at least one processor, such that the at least one processor can: obtain a data use request of a data requestor; obtain authorization information of a data owner; generate a data authorization use claim based on the authorization information, where the data authorization use claim is used for indicating that the data owner authorizes the data requestor to use the data; obtain initial data based on the data authorization use claim; verify initial data to obtain target data that passes the verification, where the target data includes a data validity claim, and the data validity claim is used for indicating the validity of the target data; and send the target data to the data requestor.

A computer readable storage medium provided by some embodiments of the present specification stores computer readable instructions. The computer readable instructions can be executed by a processor to implement a trusted data transmission method.

Some embodiments of the present specification can achieve the following beneficial effects: the data use request of the data requestor is obtained; the authorization information of the data owner is obtained; the data authorization use claim is generated based on the authorization information, and the initial data is obtained based on the data authorization use claim; the initial data is verified to obtain the target data that passes the verification, where the target data includes the data validity claim, and the data validity claim is used for indicating the validity of the target data; and the initial data is sent to the data requestor. In the previously described method, the data of the data owner can only be obtained after the data authorization use claim is obtained, i.e., any data requestor must obtain the consent of the data owner of the data when requesting to use the data. The target data transmitted to the data requestor includes the data validity claim, which can ensure the validity of data transmission, so as to ensure the security and the trustworthiness of the data transmission.

BRIEF DESCRIPTION OF DRAWINGS

To describe technical solutions in the embodiments of the present application or in the existing technology more clearly, the following briefly describes the accompanying drawings needed for describing the embodiments or the existing technology. Clearly, the accompanying drawings in the following description merely show some embodiments of the present application, and a person of ordinary skill in the art can still derive other drawings from these accompanying drawings without creative efforts.

DESCRIPTION OF EMBODIMENTS

In order to make the objectives, technical solutions, and advantages of one or more embodiments of the present specification clearer, the technical solutions of one or more embodiments of the present specification will be clearly and comprehensively described below in combination with specific embodiments of the present specification and corresponding accompanying drawings. Clearly, the described embodiments are merely some rather than all of the embodiments of the present specification. On the basis of the embodiments of the present specification, all other embodiments obtained by those of ordinary skill in the art without creative efforts fall within the scope of protection of one or more embodiments of the present specification.

Blockchain is a technical solution for collectively maintaining a trusted database by using decentralization and trustless methods, which has the characteristics of decentralization, distributed storage, encryption, and traceability. There is no centralized hardware or management institution due to the use of distributed accounting and storage. Any node has equal rights and duties. Data blocks in a system are jointly maintained by the nodes with a maintenance function in the whole system. Digital currency transactions or other data can be securely stored, the information cannot be forged or tampered with, and transaction confirmation on the blockchain is completed by all nodes on the blockchain.

The blockchain can effectively manage data asset data, such as copyright data, contract data, and game props, due to its mechanisms of consensus algorithm, encryption algorithm, etc.

In the financial field, asset data can be digital property belonging to ordinary individuals or enterprises, which is data resources that can bring future economic benefits to enterprises and organizations. It is particularly important for individuals or enterprises to protect the asset data. In the running background of big data, the asset data can satisfy the needs of scientific research and teaching, and can also satisfy the needs of enterprises or individuals to perform corresponding service processing by using data. Therefore, the asset data can be obtained through cooperation, transactions, etc. between enterprises, between enterprises and institutions, and between enterprises/institutions and individuals.

However, the data needs to be transmitted by using secure and trusted methods when the privacy of the data. In existing implementation, the data with very high privacy is usually transmitted by using private networks when it needs to be transmitted. However, the use of private network transmission will cause the blockchain meaningless. However, the data generated on each node will be broadcasted to other nodes through the distributed network in the distributed network of the blockchain if a blockchain network is used for transmission, as such there will be a risk of data leakage in a transmission process. The security and the trustworthiness of data transmission cannot be met.

The technical solutions provided by various embodiments of the present specification are described in detail below with reference to the accompanying drawings.

Figure 1:
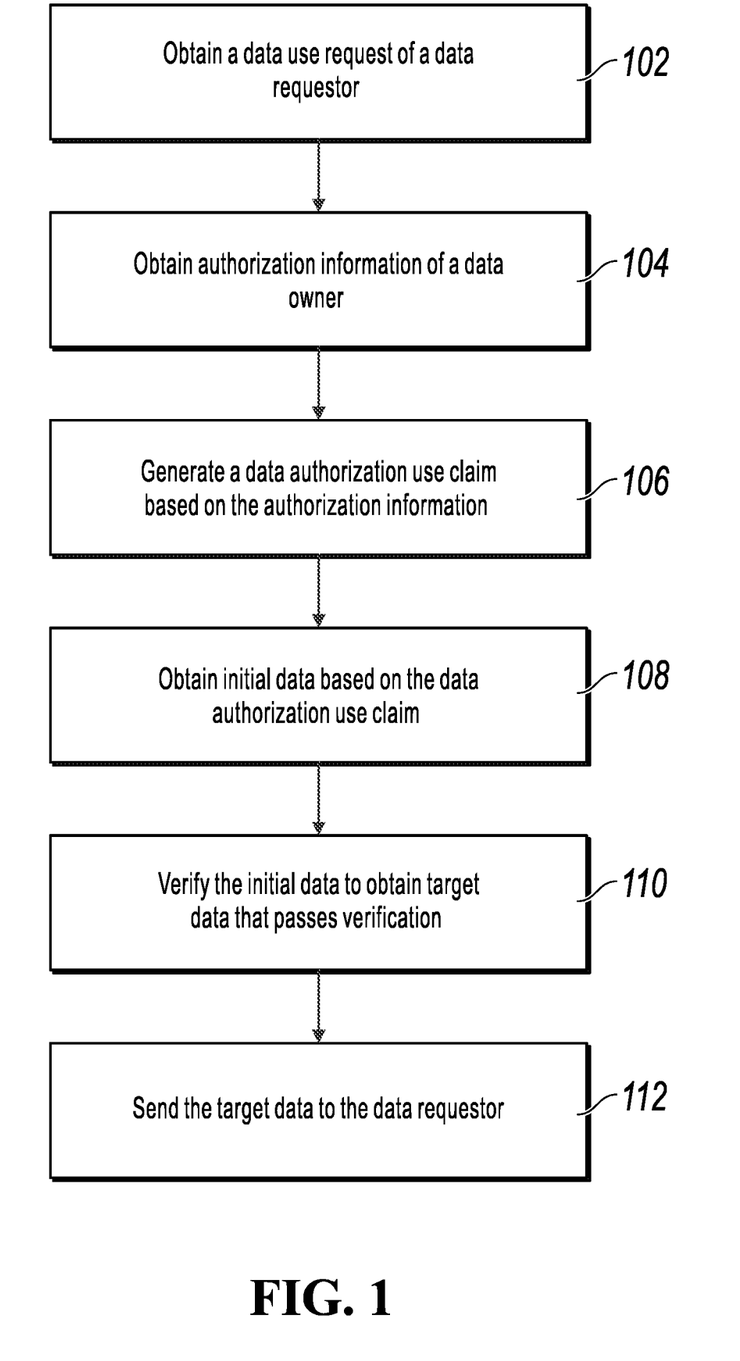
FIG. 1 is a flowchart illustrating a trusted data transmission method, according to some embodiments of the present specification.

In order to solve the defects in the existing technology, the present solution provides the following embodiments:

FIG. 1 is a flowchart illustrating a trusted data transmission method, according to some embodiments of the present specification. In view of programs, an execution body of a process can be a program or an application client device loaded on an application server. In the present embodiment, data need to be shared and flow among multiple parties. Access to data needs to be managed and controlled by the process and permission. Different participants have different permissions. Permission management and control need flexible mechanisms, and need to be tracked and audited. Therefore, there is a need for a subject that can uniformly manage the flow of the data transmission.

The execution body in the present embodiment can be an application service cluster deployed off the blockchain. The server cluster can include one or more application services. These application services can have data interaction with the blockchain network. A decentralized identifier service (DIS), an application server responsible for computing, an authorization service contract, etc. can be deployed in the application server cluster.

In some embodiments, the subject responsible for the transmission and management of trusted data can also be a private data network. The private data network is the server cluster, which can realize the transmission and management of the trusted data. In practice, the execution body can also be called a relay entity or a proxy service provider. For convenience, the execution body is uniformly described by using the proxy service provider in later embodiments. It is worthwhile to note that the proxy service provider belongs to an authorization service provider of the blockchain, and belongs to a trusted service. The trusted service can perform data interaction with the blockchain network.

Some basic information needs to be predetermined when the proxy service provider is enabled, which can mainly include: a data type and a data processing type that are supported by a platform of the proxy service provider, contract information of a trusted application (TAPP), etc. The information can also be made available to the participants.

As shown in FIG. 1, the process can include the following steps:

Step 102: a data use request of a data requestor is obtained.

The data requestor can also be called a data user, which can represent a user requesting to use the data, and the user here can be an individual and can also be an organization, such as an enterprise or an institution.

The data use request can be only one request instruction, and can also be a piece of request data including other information. The data use request can include a requested data identifier, a data type, etc. In some application scenarios, the data use request can also include a purpose of the requested data, a data identifier of the data requestor, a permission claim, a data type corresponding to the requested data, etc. This is not limited specifically in the present embodiment. The data type can represent data provided by different institutions, and can also represent different types of data provided by the same institution. For example: a personal wage record obtained from a bank, personal real estate information obtained from a real estate center, and a personal credit report obtained from a credit information service institution, where the wage record, the credit report, and the real estate information are three different types of data. Different data types can correspond to different data collection methods or data processing methods.

The data use request can be sent to an intermediate management institution (can also be called a proxy service provider) when the data requestor wants to use a data of the data owner. The proxy service provider can send the data use request to the data owner. It is worthwhile to note that there can be one or more data owners.

In addition, the data transmitted in the present embodiment can be trusted data. The trusted data can be the data stored on a trusted device. The data can be personal medical record data, photos and videos, novel documents, etc. The data can also be data used for assisting in service handling, for example: personal credit records, bank record data, etc. The trusted data can also be the data of specific annual operation conditions, asset income, company statements, etc. of a certain company. The trusted device can include blockchain networks of authority institutions, such as various banks and real estate bureaus. The trusted device can also include the hardware, such as trusted USB flash disks, trusted memories, and trusted end-user devices.

The data requested by the data requestor can be original data of the data requestor, and can also be the data obtained after the original data is processed, which is not described specifically in the embodiments of the present specification.

Step 104: authorization information of a data owner is obtained.

The data owner can also be called a data host, a data owner, etc. The data owner can represent a user having the data requested by the data requestor.

The authorization information can be an instruction that consents or authorizes the data requestor to use data only, and can also include a digital signature, authorization claim, or other information. In the present solution, the authorization information of the data owner can include the information of the digital signature of the data owner, a data use range specified by the data owner, or etc.

It is worthwhile to note that an event monitoring server can be deployed in an application system of the proxy service provider. The event monitoring server can inform the system that there is an event to be authorized when it is monitored that there is a flow event in the system, and the proxy service provider forwards the data use request to the data owner.

Step 106: a data authorization use claim is generated based on the authorization information, where the data authorization use claim is used for indicating that the data owner authorizes the data requestor to use the data.

An authorization service contract can also be deployed in the system of the proxy service provider. The authorization service contract can at least include an approval process that should be executed when the data is used, for example: the data needs to be approved by which objects, and signing needs to be performed after approval. The authorization service contract can be a predetermined program set by the proxy service provider. Any authorized data use request can trigger a corresponding authorization service contract.

The authorization service contract can be either a program set in the proxy service provider system or a program set in a blockchain network. A permission approval process can be set by the data owner, then sent to a blockchain for consensus, and stored in blocks of various nodes. Any node, as the data requestor, can trigger the authorization service contract.

The proxy service provider can generate a data authorization use claim after receiving the authorization information of the data owner, where, the data authorization use claim can also be a verifiable claim (VC) in the blockchain, which can be called a data authorization use verifiable claim (data authorization use VC). The data authorization use claim can indicate that the data owner agrees to the data requestor to use the data. The data authorization use claim can also include an approval record of authorization data, for example, a signature of an approver, and can also include a data acquisition address of the initial data, etc. The VC can include digital signatures of various approvers. Any user can verify the VC based on public keys of permission approvers.

Step 108: Initial data is obtained based on the data authorization use claim.

The proxy service provider can obtain data at a data source based on the data authorization use VC after obtaining the data authorization use VC. In this case, the data authorization use VC is equivalent to a certificate to obtain data, where, the data source can be a data acquisition port corresponding to the data acquisition address included in the data authorization use VC.

Step 110: The initial data is verified to obtain target data that passes the verification, where the target data includes a data validity claim, and the data validity claim is used for indicating the validity of the target data.

In practice, the proxy service provider needs to verify the accuracy and the validity of the initial data after obtaining the initial data. In this case, whether the obtained initial data is the data requested by the data requestor, and whether the obtained data is the data authorized by the data owner and is the initial data can be verified.

The steps of the previously described method can further include:

the initial data obtained by the data requestor is obtained by using the data collection method corresponding to the data type;

the validity of the initial data is verified;

a data validity claim is issued if the initial data is valid; and the target data including the data validity claim is sent to the data requestor, where, the step that the validity of the initial data is verified can specifically include:

Compare whether the initial data is consistent with the data type of needed data included in the data use request, to obtain a comparison result; and Verify whether the initial data has the digital signature of the data owner when the comparison result indicates that the data type of the initial data is consistent with the data type of the needed data included in the data use request.

The initial data is proved to be valid when the initial data has the digital signature of the data owner, and a data validity claim is generated.

The data validity claim at least can include: a storage address of the initial data, a data type of the initial data, a validity period of the initial data, and a data collection method of the initial data, where, the validity period of the initial data can indicate the validity period of the initial data. Specifically, the validity period of the data can be indicated by a data permission approver, can also be indicated by the proxy service provider, and can also be indicated by the data owner.

The length of the validity period can be determined based on the purpose of the used data indicated by the data requestor, and can also be determined based on the data type of the data requested by the data requestor.

The proxy service provider will write the data type, the storage address, and the validity period of the initial data, the data collection method of the initial data, etc. into the data validity claim after verifying that the initial data is valid.

The data type of the data can correspond to the data collection method. In specific setting, one data type can correspond to one data collection method, one data type can also correspond to multiple data collection methods, and multiple data types can correspond to one data collection method, which is not limited specifically in the embodiments of the present specification.

The data collection method can indicate the type of an application used for collecting the data, and can also indicate a specific algorithm used for collecting the data. In the present embodiment, the data collection method can be understood as different TAPPs. The TAPPs can run based on a trusted execution environment (TEE).

Each blockchain node can create and call a smart contract through a virtual machine. It is a challenge for privacy protection to store the transactions containing smart contracts and execution results of the transactions in ledgers of the blockchain, or to store all the ledgers in each full node of the blockchain. Privacy protection can be realized through a variety of technologies, for example, a cryptography technology (such as Homomorphic encryption, or Zero-knowledge proof), and for another example, a hardware privacy technology, and a network isolation technology. The hardware privacy technology typically includes the TEE.

The Intel software guard extensions (SGX) technology is taken as an example. The blockchain node can create an enclave based on the SGX technology to serve as the TEE for executing a blockchain transaction. The blockchain node can allocate a portion of enclave page cache (EPC) in a memory for the enclave to reside by using a new processor instruction in a CPU. A memory area corresponding to the EPC is encrypted by a memory encryption engine (MEE) in the CPU. The contents (codes and data in the enclave) in the memory area can only be decrypted in the CPU kernel, and the key used for encryption and decryption is only generated and stored in the CPU when the EPC is enabled. It can be understood that the security boundary of the enclave only includes itself and the CPU. Neither privileged nor non-privileged software can access the enclave, even an operating system administrator and a virtual machine monitor (VMM, or called hypervisor) cannot affect the codes and data in the enclave, so the enclave has high security. On the premise of guaranteeing the security previously described, the CPU can process a blockchain transaction in a plaintext form in the enclave, which has high operation efficiency, thereby guaranteeing both data security and operation efficiency. The data in and out of the TEE can be encrypted, so as to guarantee the privacy of the data.

The TEE can be created in a node on the blockchain, and can also be created in a device off the blockchain. The specified TAPP collects the initial data through an interface predefined in the codes in the TEE.

Step 112: the target data is sent to the data requestor.

The target data includes the initial data and the data validity claim. The target data is sent to the data requestor. The data requestor can determine that the initial data is the valid data based on the data validity claim.

In the method shown in FIG. 1, the data use request of the data requestor is obtained; the authorization information of the data owner is obtained; the data authorization use claim based on the authorization information is generated, and the initial data is obtained based on the data authorization use claim; the initial data is verified to obtain the target data that passes the verification; the target data includes the data validity claim used for indicating the validity of the target data; and the initial data is sent to the data requestor. In the previously described method, the data of the data owner can only be obtained after obtaining the data authorization use claim, i.e., any data requestor must obtain the consent of the data owner of the data when requesting to use the data. The target data transmitted to the data requestor includes the data validity claim, which can ensure the validity of the data transmission, so as to ensure the security and the trustworthiness of the data transmission.

The embodiments of the present specification further provide some specific implementations of the present method based on the method shown in FIG. 1, which are described below.

Optionally, the data use request can include a data type of the needed data, i.e. the data requestor can indicate the data type corresponding to the needed data when requesting to use the data.

The step that the initial data is obtained based on the data authorization use claim specifically can include the following:

the initial data is obtained by using a data collection method corresponding to the data type based on the data authorization use claim, where the data collection method includes a trusted application (TAPP) used for collecting data, and the TAPP runs in a trusted execution environment (TEE).

In the discussion with respect to the method shown in FIG. 1, the data type of the data corresponds to the collection method of the data, for example, real estate data can be collected by using a TAPP1, and the credit report can be collected by using a TAPP2. Here, "1" and "2" are only used for distinguishing different TAAPs, and do not have practical quantitative meaning.

Optionally, before the step that the initial data is obtained based on the data authorization use claim, the method can further include the following:

a TAPP specified by the data requestor is obtained, where the TAPP can run in a TEE; and the trusted execution environment can be the TEE. The TEE is the trusted execution environment that is a security extension based on CPU hardware, and is completely isolated from the outside world. At present, the industry pays close attention to solutions of the TEE. Almost all mainstream chips and software alliances have their own TEE solutions, for example, a trusted platform module (TPM) in the aspect of software, and software guard extensions (SGX), Advanced RISC Machine (ARM) trustzone, and Advanced Micro Device (AMD) platform security processor (PSP). The TEE can play a role of a hardware black box. The codes and data executed in the TEE cannot be peeped even by an operating system layer, and can only be operated through the interface predefined in the codes. In terms of efficiency, plaintext data is operated in the TEE instead of complex cryptographic operations in homomorphic encryption due to black box properties of the TEE. There is no loss of efficiency in an operation process. Therefore, the privacy needs in an off-chain scenario of the blockchain can be satisfied to a great extent on the premise of relatively small performance loss by deploying the off-chain TAPP of the blockchain in an off-chain TEE.

In the previously described steps, in order to realize the controllability of the data, the initial data is transmitted to the data requestor through the TAPP after original data of the data owner is provided for the data requestor. It can be ensured that the data is not used in the scenario without authorization of a user.

In some embodiments, if the data requested by the data requestor are not the original data of the data owner, in this case, the data can further include the following:

the initial data is collected by using the specified TAPP;

the initial data is processed by using the specified TAPP to obtain a processing result; and the processing result is transmitted to the data requestor.

In addition, in order to further guarantee the security in a data transmission process, the original data can also be encrypted in the data transmission process. The following two methods can be used when the data is encrypted:

Method 1, a data requestor specifies a TAPP, the original data is encrypted by using a public key corresponding to the specified TAPP, and the data requestor can decrypt by using a private key corresponding to the specified TAPP. Method 1 can be implemented by using the following steps specifically:

the step that the initial data is obtained can specifically include:

the initial data is collected by using the specified TAPP, where the initial data is data encrypted by using a public key corresponding to the specified TAPP.

Optionally, after the step that the target data is sent to the data requestor, the method can further include the following:

the target data is decrypted by using a private key corresponding to the specified TAPP.

Method 2, the data requestor does not specify a TAPP.

The initial data is the data encrypted by using a public key of the data requestor or a public key of a data owner when the data requestor does not specify the TAPP.

When the initial data is the data encrypted by using the public key of the data requestor or the public key of the data owner, after the target data is sent to the data requestor, the method can further include the following:

the initial data in the target data is decrypted by using a private key of the data requestor when the initial data is the data encrypted by using the public key of the data requestor;

the data authorization use VC includes the private key of the data owner when the initial data is the data encrypted by using the public key of the data owner; and after the step that the target data is sent to the data requestor, the method can further include the following:

the initial data in the target data is decrypted by using the private key of the data owner.

In practice, the data can be encrypted by using a public key when encrypted and can be decrypted by using a private key, so as to ensure the security of information. The data can also be encrypted by using a private key and decrypted by using a public key in a digital signature way, so as to ensure the attribution of the digital signature. However, in some special application scenarios, the data owner can encrypt the data by using its public key, and then send its private key to a corresponding data owner, such that the data owner can decrypt the data by using the private key of the data owner. In the present embodiment, the data authorization use VC can include the private key of the data owner, and then is transmitted to the data requestor.

By the previously described two methods, a data requestor can specify a TAPP for collecting data when requesting to use data. The proxy service provider can collect the initial data by using the specified TAPP after obtaining the authorization of the data owner. The TAPP can only run in the TEE, so a secure data reading environment can be provided for data collection. In addition, the transmitted initial data is an encrypted data, so as to ensure that both data acquisition and data transmission are secure and trusted, and improve the trustworthiness of the obtained data contents.

In addition, it is worthwhile to note that the TAPP mentioned in the steps of the method can be selected and installed by various users (individuals, institutions, enterprises, etc.). Which TAAPs to install is related to the service needs of each user. Each user can select the TAPP that needs to be installed based on his own service needs. Each TAPP can have corresponding description information. The description information can be the name, type, version number, function information, or summary information of the TAPP. The purpose and function of the TAPP can be determined through description information. The description information can be stored in the blockchain network. In the present solution, the proxy service provider can transmit the description information of the TAPP into the blockchain network for storing.

Optionally, before the step that a data use request of a data requestor is obtained, the method can further include the following:

a data directory issued by the data owner in the blockchain network is obtained, where the data in the data directory is the data allowed to be disclosed by the data owner.

It is worthwhile to note that, in practice, the data requestor can select the data to be requested from the data directory when requesting to use the data. Entities can issue the data held by themselves in the blockchain network. In an issuing process, various entities can also claim which data they hold is allowed to be disclosed. The disclosed data can be requested to use by other entities.

In the previously described method, before a data directory issued by the data owner in the blockchain network is obtained, the method can further include the following:

the blockchain network obtains the data issued by the various entities;

the data with an identifier in the data is determined, where the identifier is used for indicating that the data including the identifier is allowed to be disclosed; and data description information is added to the data including the identifier, and the data including the identifier and the corresponding data description information are added into the data directory. The data description information can include the data type, data owner information of the data, the collection method of the data, etc.

The data directory can be stored in the blockchain network. The data directory of each entity can be shown to the data owner and other entities simultaneously. In the present solution, the proxy service provider can obtain the data directory from the blockchain network. In this case, the data directory can only include the description information of the data in order to guarantee the security of the data. The data requestor can select the needed data only based on the description information in the data directory when requesting the data.

Optionally, the step that authorization information of a data owner is obtained can specifically include:

an authorization request notification is sent to the data owner based on the data use request, where the authorization request notification is a uniform resource locator (URL) address;

an operation behavior of the data owner in a web page corresponding to the URL address is obtained; and the authorization information of the data owner is obtained when the operation behavior indicates that the data owner agrees to the data use request of the data requestor.

The proxy service provider can directly forward a data use request of the data requestor to the data owner after receiving the data use request of the data requestor, and can also generate an authorization request notification based on the data use request and send the authorization request notification to the data owner instead of sending the data use request to the data owner. In this case, the authorization request notification can include: information of the data requestor, data requested by the data requestor, the data type of the requested data, a specified TAPP, etc. In practice, the address of the authorization request notification can be sent to the data owner based on the URL. The data owner clicks an address link to a corresponding web page. The information of the data requestor, the data requested by the data requestor, the data type of the requested data, the specified TAPP, etc. can be displayed in the web page, and then buttons of "Agree" or "Disagree" are set. The data owner can click "Agree" if the data owner agrees to the data use request of the data requestor. The data owner can generate authorization information (for example: digital signature of the data owner) when the data owner agrees to the data use request of the data requestor.

It is worthwhile to note that the data authorization use claim can be generated after the proxy service provider receives the authorization information of the data owner. The data authorization use claim can include the authorization information of the data owner, or not include the authorization information of the data owner. The proxy service provider generates the data authorization use claim, which can prove that the data owner has agreed to the data use request of the data requestor.

In practice, the proxy service provider issues the data authorization use claim, which also means that the data requested to use by the data requestor has been approved. Therefore, the data authorization use claim can also include an approval record, where, the setting of an approval process can be completed by the blockchain network, and can also be completed by the proxy service provider.

The setting of the approval process can be set based on the owner of each piece of data, can also be set based on the purpose of the data, and can also be set based on the type of the data, which is not specifically limited in the present embodiment. The approval process can include: at least one approver, criteria of approval, sequence of approval, operations corresponding to whether the data is approved or not, etc. For example: the approval process describes that each approver should sign after the data passes the approval, and describes the processes of approving, forwarding, signing, etc.

The approval records of each piece of data can be stored in the blockchain network for subsequent query. The approval process can be stored in an authorization service contract.

If the data requestor specifies a TAPP to collect data, the proxy service provider can send the data authorization use claim to the specified TAPP. The TAPP can collect the initial data from the data acquisition address in the data authorization use claim.

Optionally, before the initial data collected by the TAPP from a data acquisition address in the data authorization use claim is obtained, the method can further include the following:

a first verification result of the TAPP for the data authorization use claim is obtained;

the step that the initial data collected by the TAPP from a data acquisition address in the data authorization use claim is obtained can specifically include the following:

a data acquisition request is sent to the data owner when the first verification result indicates that the data authorization use claim is valid, where the authorization use claim is used for indicating that an approval record of the data use request is valid; and the initial data returned by the data owner is received.

Optionally, the data acquisition request includes an identifier of the TAPP; before the step that the initial data returned by the data owner is received, the method can further include the following:

a second verification result of the data owner for the identifier of the TAPP is obtained;

the step that the initial data returned by the data owner is received can specifically include:

the initial data returned by the data owner is received when the second verification result indicates that the identifier of the TAPP is consistent with an identifier of the specified TAPP.

Optionally, the method can further include the following:

the initial data is obtained by the data requestor by using a data collection method corresponding to the data type;

the validity of the initial data is verified to obtain a third verification result;

a data validity claim is issued when the third verification result indicates that the initial data is valid; and the target data including the data validity claim is sent to the data requestor.

It is worthwhile to note that the valid approval record mentioned in the steps can indicate that the approval process is consistent with a predetermined approval process, and includes the signatures of all specified approvers, etc.

The collection method of the data can be verified, and whether the collected initial data is the requested data, or whether the data type of the collected initial data is consistent with the requested data type can also be verified when verifying the validity of the initial data, where, the operation of verifying the collection method for the data can include verifying whether the identifier of the TAPP for collecting the initial data corresponds to the identifier specified by the data requestor or corresponds to the data type.

It is worthwhile to note that the operation of verifying the identifier of the TAPP can be executed by a proxy platform, and can also be executed by a data owner.

Before the step that a second verification result of the data owner verifying the identifier of the TAPP is obtained, the method can further include the following:

whether the identifier of the TAPP is consistent with the identifier of the TAPP specified in the data requestor is verified to obtain a second verification result;

or, whether the identifier of the TAPP is consistent with the identifier of the TAPP corresponding to the data type of the data needed by the data requestor is verified to obtain a verification result.

By the previously described method, the proxy service provider can only select a corresponding data collection method for collecting the data from the data acquisition address in the data authorization use claim after the authorization of the data owner is obtained and the data passes the approval of the approver in a data transmission process. The collected data and the data validity claim can be transmitted to the data requestor only after the data is collected by using the specified TAPP and the collected data is the data needed by the data requestor (the data is valid and has the data validity claim), which can ensure the security and the trustworthiness of the data transmission.

Optionally, the proxy service provider can monitor the use information of the data requestor for the target data after the target data is sent to the data requestor. The use information can include use range and use time. When it is monitored that the use range is beyond the specified data use range, the use permission of the data requestor for the target data is revoked; or when it is monitored that the use time is beyond the specified validity period, the use permission of the data requestor for the target data is revoked.

By the previously described method, the use range of the data requestor for the target data cannot exceed the use range specified by the data owner, and the use time can not exceed the specified validity period, so as to ensure the use security of the data.

Figure 2:
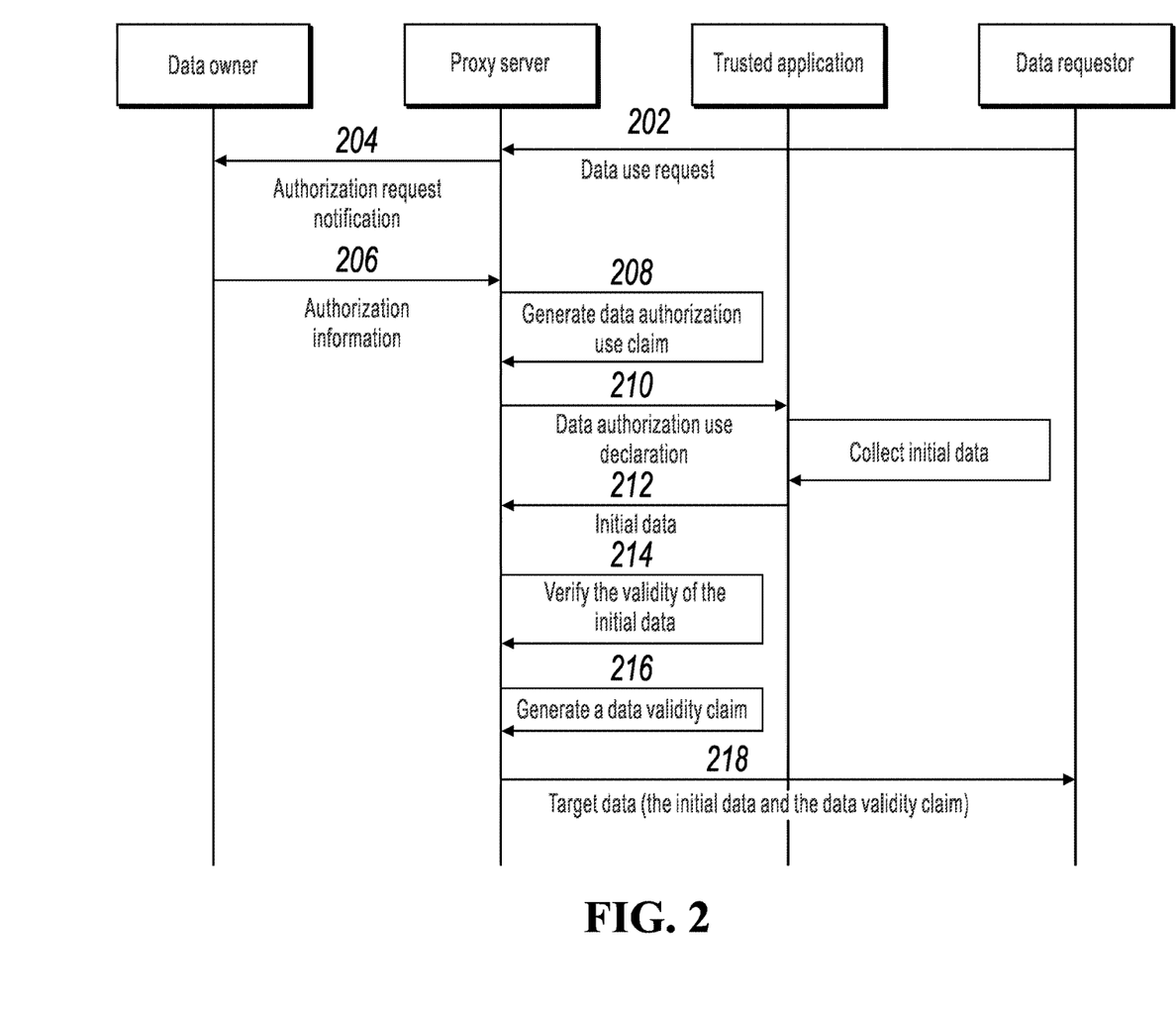
FIG. 2 is flowchart 1 illustrating a trusted data transmission method when a trusted application (TAPP) is specified, according to some embodiments of the present specification.
Figure 3:
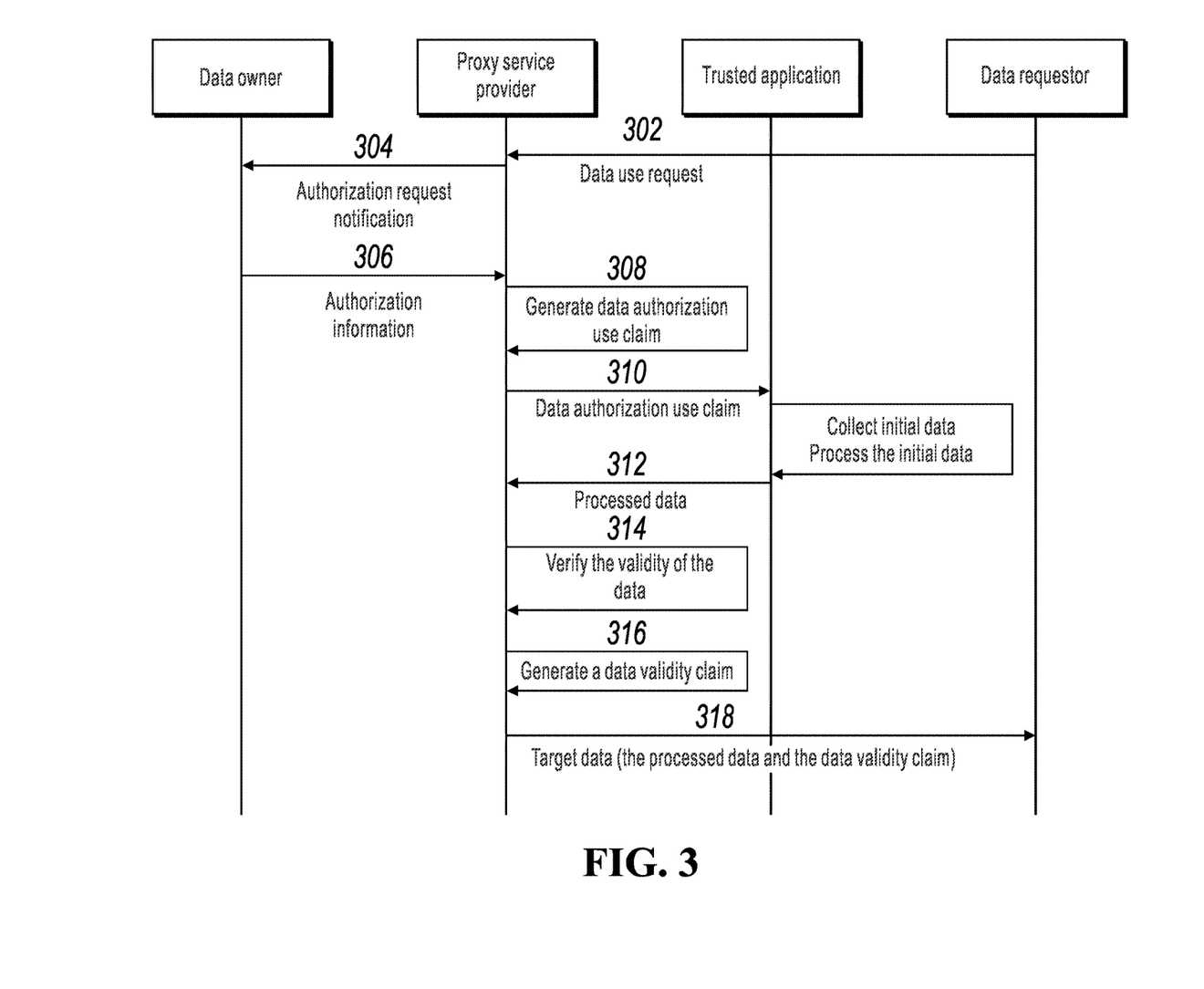
FIG. 3 is flowchart 2 illustrating a trusted data transmission method when a TAPP is specified, according to some embodiments of the present specification.

The method in the previously described embodiments can be implemented in combination with two specific methods in FIG. 2 and FIG. 3.

Method 1, the data requestor specifies a TAPP to request to use original data.

FIG. 2 is flowchart 1 illustrating a trusted data transmission method when a TAPP is specified, according to some embodiments of the present specification.

As shown in FIG. 2, the data transmission can include the following steps:

Step 202: A data use request of a data requestor is obtained, where the data use request includes a specified TAPP.

Step 204: An authorization request notification is sent to a data owner.

Step 206: Authorization information returned by the data owner based on the authorization request notification is received.

Step 208: A data authorization use claim is generated based on the authorization information.

Step 210: The data authorization use claim is sent to the specified TAPP.

Step 212: The initial data collected by the specified TAPP is received, where the initial data is the data encrypted by the data owner.

Step 214: The validity of the initial data is verified.

Step 216: A data validity claim is generated after the initial data passes the verification.

Step 218: Target data including the data validity claim is transmitted to the data requestor.

Method 2, the data requestor specifies a TAPP to request to use the processed data.

FIG. 3 is flowchart 2 illustrating a trusted data transmission method when a TAPP is specified, according to some embodiments of the present specification.

As shown in FIG. 3, the data transmission can include the following steps:

Step 302: A data use request of a data requestor is obtained, where the data use request includes a specified TAPP.

Step 304: An authorization request notification is sent to a data owner.

Step 306: Authorization information returned by the data owner based on the authorization request notification is received.

Step 308: A data authorization use claim is generated based on the authorization information.

Step 310: The data authorization use claim is sent to the specified TAPP.

Step 312: The data collected and processed by the specified TAPP is received.

Step 314: The validity of the processed data is verified.

Step 316: A data validity claim is generated after the processed data passes the verification.

Step 318: Target data including the data validity claim (the processed data including the validity claim) is sent to the data requestor.

It is worthwhile to note that the TAPP for collecting the data and the TAPP for processing the data can be the same one, or can also be different TAAPs. One or more TAAPs can be used for collecting the data, and one or more TAAPs can also be used for processing the data, which is not specifically limited in the embodiments of the present specification.

Figure 4:
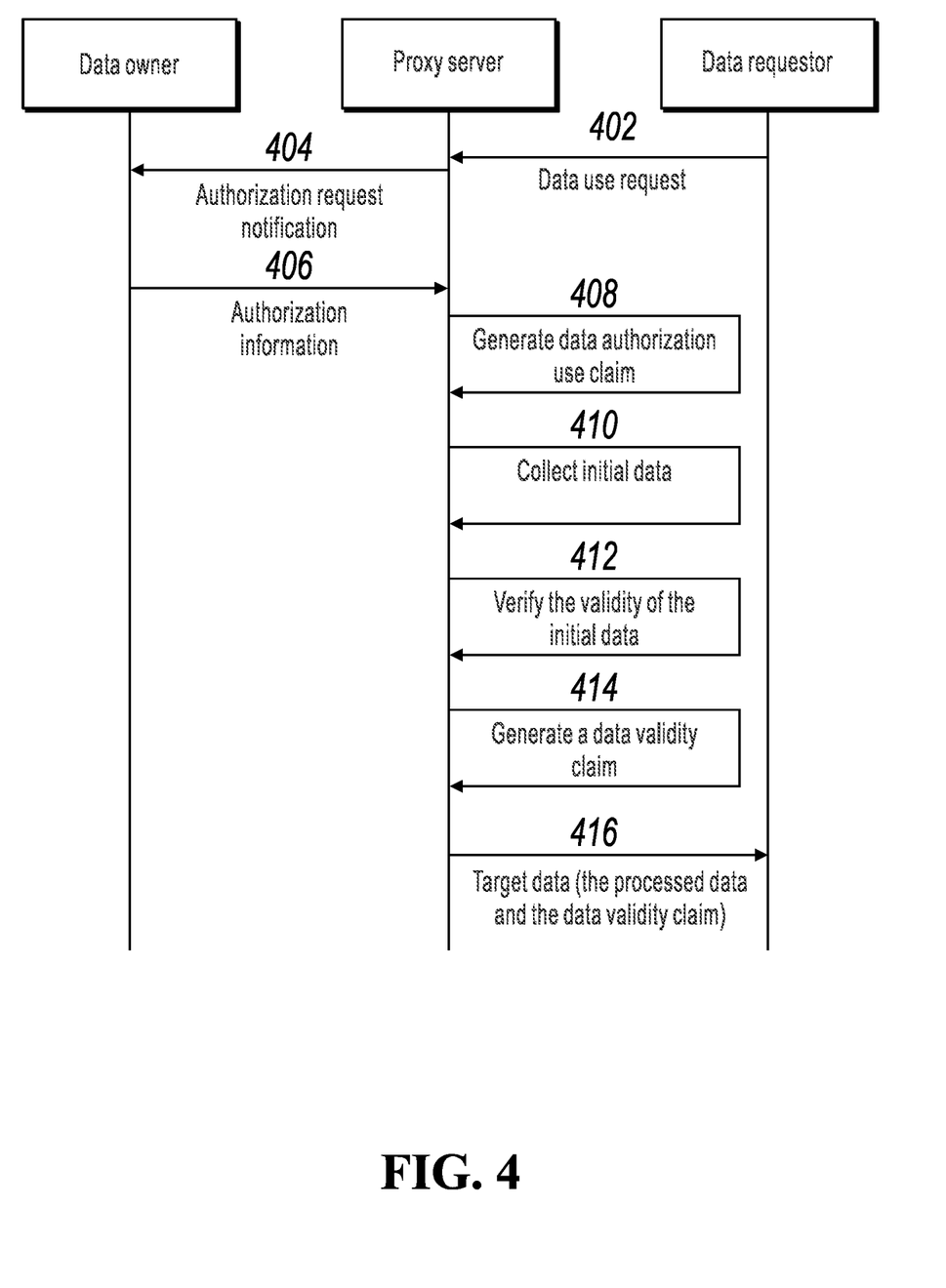
FIG. 4 is a flowchart illustrating a data transmission method when a TAPP is not specified, according to some embodiments of the present specification.

Method 3, the data requestor does not specify a TAPP.

FIG. 4 is a flowchart illustrating a data transmission method when a TAPP is not specified, according to some embodiments of the present specification.

As shown in FIG. 4, the data transmission can include the following steps:

Step 402: A data use request of a data requestor is obtained, where the data use request includes a data type of the data needed by the data use request.

Step 404: An authorization request notification is sent to a data owner.

Step 406: Authorization information returned by the data owner based on the authorization request notification is received.

Step 408: A data authorization use claim is generated based on the authorization information.

Step 410: Initial data is obtained based on the data authorization use claim.

Step 412: The validity of the initial data is verified.

Step 414: A data validity claim is generated after the initial data passes the verification.

Step 416: Target data including the data validity claim is transmitted to the data requestor.

The solution can achieve the following technical effects by the steps of the method in the previously described embodiments:

1) Any data requestor who wants to use the data must be authorized by the data owner.

2) The data needs to be called based on the conditions described by the data owner, the proxy service provider, or the blockchain.

3) The data can only be used in the range specified by the data owner, and cannot be used beyond the range; and the data can only be used within the validity period, so as to ensure the security of data use.

4) The proxy responsible for forwarding and transmission in a transmission process is a TAPP authorized by the blockchain network, which can ensure the security of the data transmission process.

5) The data of the data owner can be obtained only after obtaining the data authorization use claim, i.e. any data requestor must obtain the consent of the data owner when requesting to use the data; the target data transmitted to the data requestor includes the data validity claim, which can ensure the validity of data transmission, so as to guarantee the security and the trustworthiness of data transmission.

Figure 5:
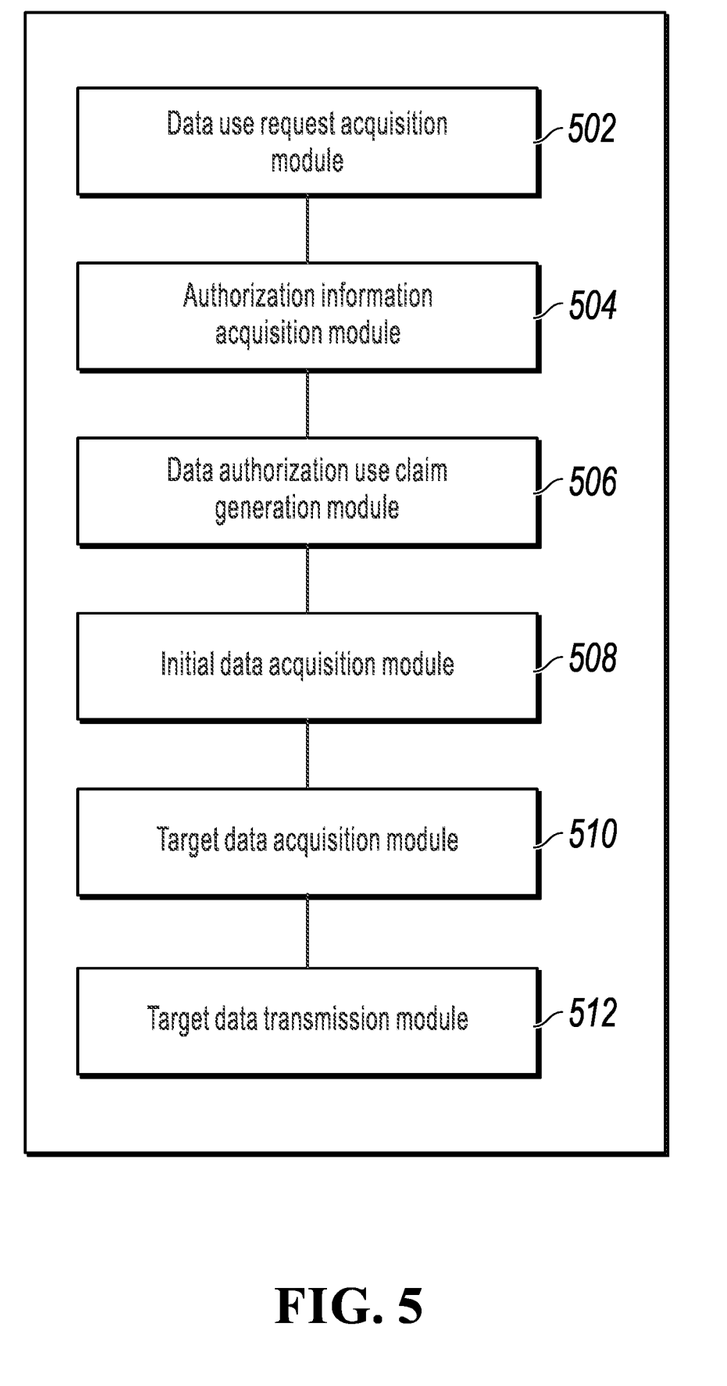
FIG. 5 is a schematic diagram illustrating a trusted data transmission apparatus, according to some embodiments of the present specification.

The embodiments of the present specification further provide an apparatus corresponding to the previously described method based on the same idea. FIG. 5 is a schematic diagram illustrating a trusted data transmission apparatus, according to some embodiments of the present specification; As shown in FIG. 5, the apparatus can include:

a data use request acquisition module 502, configured to obtain a data use request of a data requestor;

an authorization information acquisition module 504, configured to obtain authorization information of a data owner;

a data authorization use claim generation module 506, configured to generate a data authorization use claim based on the authorization information, where the data authorization use claim is used for indicating that the data owner authorizes the data requestor to use the data;

an initial data acquisition module 508, configured to obtain initial data based on the data authorization use claim;

a target data acquisition module 510, configured to verify the initial data to obtain target data that passes the verification, where the target data includes a data validity claim, and the data validity claim is used for indicating the validity of the target data; and a target data transmission module 512, configured to send the target data to the data requestor.

The embodiments of the present specification further provide some specific implementations of the method based on the apparatus shown in FIG. 5, which are described below.

Optionally, the initial data acquisition module 508 can specifically include:

a first initial data acquisition unit, configured to obtain the initial data by using a data collection method corresponding to the data type based on the data authorization use claim, where the data collection method includes a TAPP used for collecting data, and the TAPP runs in a TEE.

Optionally, the apparatus can further include:

a TAPP acquisition module, configured to obtain a TAPP specified by the data requestor, where the specified TAPP runs in the TEE; and the initial data acquisition module 508 specifically includes:

a second initial data acquisition unit, configured to collect the initial data by using the specified TAPP, where the initial data is data encrypted by using a public key corresponding to the specified TAPP. The TEE is isolated from an operating system layer. The specified TAPP collects the initial data through an interface predefined in the codes in the TEE.

Optionally, the apparatus can further include:

a first decryption module, configured to decrypt the target data by using a private key corresponding to the specified TAPP.

Optionally, the apparatus can further include:

a data directory acquisition module, configured to obtain a data directory issued by the data owner in a blockchain network, where data in the data directory is data allowed to be disclosed by the data owner.

Optionally, the authorization information acquisition module 504 can specifically include:

an authorization request notification sending unit, configured to send an authorization request notification to the data owner based on the data use request, where the authorization request notification is a URL address;

an operation behavior acquisition unit, configured to obtain an operation behavior of the data owner in a web page corresponding to the URL address; and an authorization information acquisition unit, configured to obtain the authorization information of the data owner when the operation behavior indicates that the data owner agrees to the data use request of the data requestor.

Optionally, the initial data acquisition module 508 is specifically configured to:

send the data authorization use claim to the TAPP in a proxy service provider device; and obtain the initial data collected by the TAPP from a data acquisition address in the data authorization use claim.

Optionally, the apparatus can further include:

a first verification module, configured to obtain a first verification result of the TAPP for the data authorization use claim;

the initial data acquisition module is specifically configured to:

send a data acquisition request to the data owner when the first verification result indicates that the data authorization use claim is valid, where the authorization use claim is used for indicating that an approval record of the data use request is valid; and receive the initial data returned by the data owner.

Optionally, the apparatus can further include:

a second verification module, configured to receive a second verification result of the data owner for the identifier of the TAPP;

the initial data acquisition module 508 is specifically configured to:

receive the initial data returned by the data owner when the second verification result indicates that the identifier of the TAPP is consistent with an identifier of the specified TAPP.

Optionally, the initial data is the data encrypted by using a public key of the data requestor or a public key of the data owner when the data requestor does not specify a TAPP.

Optionally, the apparatus can further include:

a second decryption module, configured to decrypt the initial data in the target data by using a private key of the data requestor when the initial data is the data encrypted by using the public key of the data requestor; and a third decryption module, configured to decrypt the initial data in the target data by using a private key of the data owner, where the data usage authorization VC includes a private key of the data owner when the initial data is the data encrypted by using the public key of the data owner.

Optionally, the apparatus can be further configured to:

obtain the initial data obtained by the data requestor by using a data collection method corresponding to the data type;

verify the validity of the initial data to obtain a third verification result;

issue a data validity claim when the third verification result indicates that the initial data is valid; and send the target data including the data validity claim to the data requestor.

Optionally, the data authorization use claim can at least include: an approval record of the initial data and a data acquisition address of the initial data;

the data validity claim can at least include: a storage address of the initial data, the data type of the initial data, a validity period of the initial data, and the data collection method of the initial data; and the authorization information can at least include a specified use range of the initial data.

Optionally, the apparatus can further include:

a monitoring module, configured to monitor a data use range and a data use time of the data requestor for the target data; and a use permission revoking module, configured to revoke a use permission of the data requestor for the target data when it is monitored that the data use range is beyond a specified use range, or, revoke a use permission of the data requestor for the target data when it is monitored that the data use time is beyond the validity period.

The embodiments of the present specification further provide a device corresponding to the previously described method based on the same idea.

Figure 6:
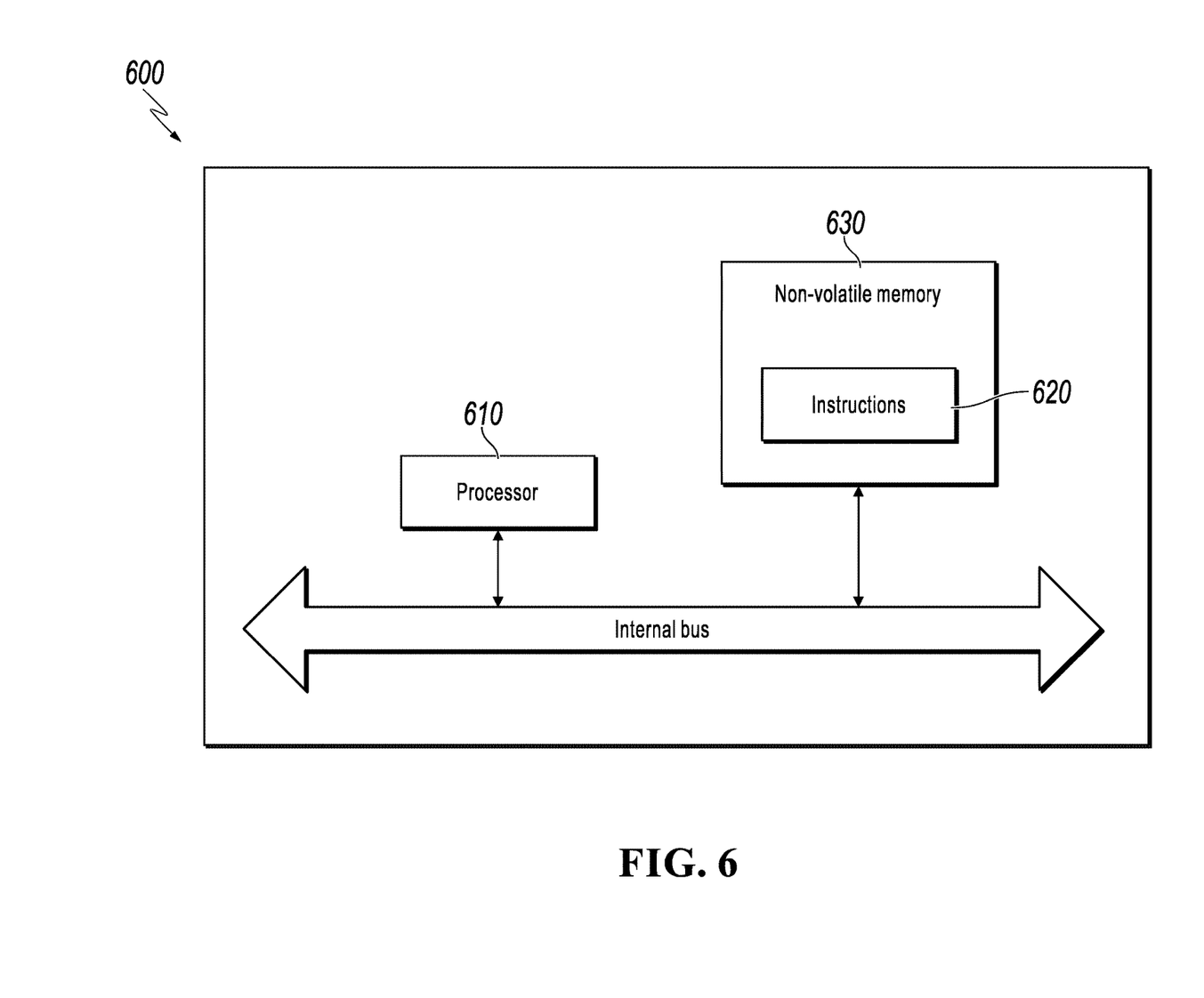
FIG. 6 is a schematic diagram illustrating a trusted data transmission device, according to some embodiments of the present specification.

FIG. 6 is a schematic diagram illustrating a trusted data transmission device, according to some embodiments of the present specification. As shown in FIG. 6, the network-side device 600 can include:

at least one processor 610; and a memory 630 communicatively connected to the at least one processor, where the memory 630 stores instructions 620 that can be executed by the at least one processor 610, and the instructions are executed by the at least one processor 610, such that the at least one processor 610 can:

obtain a data use request of a data requestor;

obtain authorization information of a data owner;

generate a data authorization use claim based on the authorization information, where the data authorization use claim is used for indicating that the data owner authorizes the data requestor to use the data;

obtain initial data based on the data authorization use claim;

verify initial data to obtain target data that passes the verification, where the target data includes a data validity claim, and the data validity claim is used for indicating the validity of the target data; and send the target data to the data requestor.

The embodiments of the present specification further provide a computer-readable medium based on the same idea. Computer readable instructions are stored on the computer readable storage medium. The computer readable instructions can be executed by the processor to implement the method as follows:

obtaining a data use request of a data requestor;

obtaining authorization information of a data owner;

generating a data authorization use claim based on the authorization information, where the data authorization use claim is used for indicating that the data owner authorizes the data requestor to use the data;

obtaining initial data based on the data authorization use claim;

verifying the initial data to obtain target data that passes the verification, where the target data includes a data validity claim, and the data validity claim is used for indicating the validity of the target data; and sending the target data to the data requestor.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, the current improvement for many method procedures can be considered as a direct improvement of a hardware circuit structure. A designer usually programs an improved method procedure to a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and a device configured to implement various functions in the controller can also be considered as a structure in the hardware component. Or the apparatus configured to implement various functions can even be considered as both a software module implementing the method and a structure in the hardware component.

The system, apparatus, module, or unit illustrated in the embodiments can be implemented by using a computer chip or an entity, or can be implemented by using a product having a certain function. A typical implementation device is a computer. A specific form of the computer can be a personal computer, a laptop computer, a cellular phone, a camera phone, an intelligent phone, a personal digital assistant, a media player, a navigation device, an email transceiver device, a game console, a tablet computer, a wearable device, or any combination thereof.

For ease of description, the apparatus above is described by dividing functions into various units. Certainly, when the present application is implemented, a function of each unit can be implemented in one or more pieces of software and/or hardware.

A person skilled in the art should understand that the embodiments of the present specification can be provided as methods, systems, or computer program products. Therefore, the present specification can take a form of complete hardware embodiments, complete software embodiments, or embodiments combining software and hardware. Further, the present specification can take a form of a computer program product implemented on one or more computer-usable storage media (including but not limited to disk storage, CD-ROM, and optical storage) containing computer-usable program code.

The present specification is described with reference to the flowcharts and/or block diagrams of the method, the device (system), and the computer program product according to the embodiments of the present specification. It should be noted that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. Based on the definition in the present specification, the computer readable medium does not include transitory media such as a modulated data signal and carrier.

It is also worthwhile to note that terms "include", "comprise" or any other variant thereof is intended to cover non-exclusive inclusion, so processes, methods, products or devices that include a series of elements include not only those elements but also other elements that are not explicitly listed, or elements inherent in such processes, methods, products or devices. An element described by "includes a . . ." further includes, without more constraints, another identical element in the process, method, product, or device that includes the element.

A person skilled in the art should understand that embodiments of the present application can be provided as methods, systems, or computer program products. Therefore, the present application can use a form of hardware only embodiments, software only embodiments, or embodiments with a combination of software and hardware. In addition, the present application can use a form of a computer program product that is implemented on one or more computer-usable storage media (including but not limited to a disk memory, a CD-ROM, an optical memory, etc.) that include computer-usable program code.

The present application can be described in the general context of computer executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The previous embodiments are embodiments of the present application, and are not intended to limit the present application. For a person skilled in the art, the present application can be subject to various modifications and variations. Any modification, equivalent replacement or improvement made within spirit and principles of the present application shall be included in claims of the present application.

What is claimed is:
1. A computer-implemented method, comprising:
  identifying a data use request of a data requestor, wherein the data use request comprises a data type of target data;
  identifying authorization information of a data owner;
  generating a data use authorization claim based on the authorization information, wherein the data use authorization claim indicates that the data owner authorizes the data requestor to use data;

sending the data use authorization claim to a trusted application (TAPP) in a proxy service provider device, wherein the TAPP corresponds to the data type of the target data;

obtaining initial data collected by the TAPP from a data acquisition address in the data use authorization claim, wherein the TAPP is executed in a trusted execution environment (TEE) and is configured to collect the initial data;

verifying the initial data to obtain the target data that is successfully verified, wherein the target data comprises a data validity claim indicating a validity of the target data; and sending the target data to the data requestor.

2. The computer-implemented method of claim 1, wherein the initial data is encrypted data encrypted by using a public key corresponding to the TAPP.

3. The computer-implemented method of claim 2, comprising:

decrypting the target data by using a private key corresponding to the TAPP after sending the target data to the data requestor.

4. The computer-implemented method of claim 1, comprising:

obtaining a first verification result of the TAPP for the data use authorization claim, wherein the first verification result indicates that the data use authorization claim is valid, wherein the data use authorization claim indicates that an approval record of the data use request is valid, and wherein obtaining the initial data collected by the TAPP from the data acquisition address in the data use authorization claim comprises:

sending a data acquisition request to the data owner; and receiving the initial data from the data owner.

5. The computer-implemented method of claim 4, wherein the data acquisition request comprises an identifier of the TAPP, the computer-implemented method comprises:

receiving a second verification result of the data owner for the identifier of the TAPP, wherein the second verification result indicates that the identifier of the TAPP is same as an identifier of the TAPP provided by the data requestor, and wherein the initial data from the data owner is received in response to the second verification result.

6. The computer-implemented method of claim 1, comprising:

before identifying the data use request, obtaining a data directory issued by the data owner in a blockchain network, wherein the data directory comprises data authorized to be disclosed by the data owner.

7. The computer-implemented method of claim 1, wherein identifying authorization information of the data owner comprises:

sending an authorization request notification to the data owner based on the data use request, wherein the authorization request notification comprises a uniform resource locator (URL) address;

determining an operation behavior of the data owner in a web page corresponding to the URL address; and obtaining the authorization information of the data owner in response to determining that the operation behavior indicates that the data owner agrees to the data use request of the data requestor.

8. The computer-implemented method of claim 1, wherein the initial data is encrypted by using a public key of the data owner, and the computer-implemented method comprises:

decrypting the initial data by using a private key of the data owner, wherein the private key is comprised in the data use authorization claim.

9. The computer-implemented method of claim 1, wherein the data use authorization claim comprises an approval record of the initial data and a data acquisition address of the initial data, wherein the data validity claim comprises a storage address of the initial data, a data type of the initial data, a validity period of the initial data, and a data collection method of the initial data, and wherein the authorization information comprises a scope-of-use of the initial data.

10. A non-transitory, computer-readable medium storing one or more instructions executable by a computer system to perform operations comprising:

identifying a data use request of a data requestor, wherein the data use request comprises a data type of target data;

identifying authorization information of a data owner;

generating a data use authorization claim based on the authorization information, wherein the data use authorization claim indicates that the data owner authorizes the data requestor to use data;

sending the data use authorization claim to a trusted application (TAPP) in a proxy service provider device, wherein the TAPP corresponds to the data type of the target data;

obtaining initial data collected by the TAPP from a data acquisition address in the data use authorization claim, wherein the TAPP is executed in a trusted execution environment (TEE) and is configured to collect the initial data;

verifying the initial data to obtain the target data that is successfully verified, wherein the target data comprises a data validity claim indicating a validity of the target data; and sending the target data to the data requestor.

11. The non-transitory, computer-readable medium of claim 10, comprising:

wherein the initial data is encrypted data encrypted by using a public key corresponding to the TAPP.

12. The non-transitory, computer-readable medium of claim 11, comprising:

decrypting the target data by using a private key corresponding to the TAPP after sending the target data to the data requestor.

13. The non-transitory, computer-readable medium of claim 10, comprising:

obtaining a first verification result of the TAPP for the data use authorization claim, wherein the first verification result indicates that the data use authorization claim is valid, wherein the data use authorization claim indicates that an approval record of the data use request is valid, and wherein obtaining the initial data collected by the TAPP from the data acquisition address in the data use authorization claim comprises:

sending a data acquisition request to the data owner; and
receiving the initial data from the data owner.

14. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

identifying a data use request of a data requestor, wherein the data use request comprises a data type of target data;

identifying authorization information of a data owner;

generating a data use authorization claim based on the authorization information, wherein the data use authorization claim indicates that the data owner authorizes the data requestor to use data;

sending the data use authorization claim to a trusted application (TAPP) in a proxy service provider device, wherein the TAPP corresponds to the data type of the target data;

obtaining initial data collected by the TAPP from a data acquisition address in the data use authorization claim, wherein the TAPP is executed in a trusted execution environment (TEE) and is configured to collect the initial data;

verifying the initial data to obtain the target data that is successfully verified, wherein the target data comprises a data validity claim indicating a validity of the target data; and sending the target data to the data requestor.

15. The computer-implemented system of claim 14, comprising:

wherein the initial data is encrypted data encrypted by using a public key corresponding to the TAPP.

* * * * *